(12) United States Patent
Civiletto

(10) Patent No.: US 9,948,970 B2
(45) Date of Patent: Apr. 17, 2018

(54) SYSTEMS, METHODS, AND APPARATUS FOR ACCESSING RECORDINGS OF CONTENT ITEMS ON MULTIPLE CUSTOMER DEVICES

(71) Applicant: Cox Communications, Inc., Atlanta, GA (US)

(72) Inventor: John Civiletto, Atlanta, GA (US)

(73) Assignee: Cox Communications, Inc., Atlanta, GA (US)

( * ) Notice: Subject to any disclaimer, the term of this patent is extended or adjusted under 35 U.S.C. 154(b) by 0 days.

(21) Appl. No.: 14/059,066

(22) Filed: Oct. 21, 2013

(65) Prior Publication Data

US 2014/0282750 A1 Sep. 18, 2014

Related U.S. Application Data

(60) Provisional application No. 61/791,493, filed on Mar. 15, 2013.

(51) Int. Cl.
| | |
|---|---|
| H04N 7/173 | (2011.01) |
| H04N 21/2747 | (2011.01) |
| H04N 21/231 | (2011.01) |
| H04N 21/254 | (2011.01) |
| H04N 21/4147 | (2011.01) |
| H04N 21/433 | (2011.01) |
| H04N 21/4627 | (2011.01) |

(52) U.S. Cl.
CPC ... *H04N 21/2747* (2013.01); *H04N 21/23106* (2013.01); *H04N 21/23116* (2013.01); *H04N 21/2541* (2013.01); *H04N 21/4147* (2013.01); *H04N 21/4334* (2013.01); *H04N 21/4627* (2013.01)

(58) Field of Classification Search
CPC combination set(s) only.
See application file for complete search history.

(56) References Cited

U.S. PATENT DOCUMENTS

| | | | | |
|---|---|---|---|---|
| 5,790,176 | A * | 8/1998 | Craig | 725/115 |
| 7,392,467 | B2 * | 6/2008 | Jun | G06F 17/30044 |
| | | | | 348/E7.061 |
| 7,900,231 | B2 * | 3/2011 | Paxton et al. | 725/93 |
| 2002/0026645 | A1 * | 2/2002 | Son et al. | 725/117 |
| 2002/0162109 | A1 * | 10/2002 | Shteyn | 725/87 |
| 2003/0018582 | A1 * | 1/2003 | Yaacovi | 705/51 |

(Continued)

*Primary Examiner* — Fernando Alcon
(74) *Attorney, Agent, or Firm* — Eversheds Sutherland (US) LLP

(57) ABSTRACT

Certain embodiments of the disclosure may include systems, methods and apparatuses for recording and viewing content items on multiple devices. According to an example embodiment, a method is provided for displaying recorded content to a user. The method includes receiving, from a playback device and by a service provider system comprising at least one processor, a request to retrieve a recorded content item, wherein the recorded content item is recorded on a recording device. The method further includes identifying, by the service provider system, based at least in part upon the received request, at least a portion of the recorded content item as a unique recording specific to the recording device. The method also includes facilitating, by the service provider system, access of the unique recording to the playback device.

19 Claims, 9 Drawing Sheets

(56) References Cited

U.S. PATENT DOCUMENTS

| | | | |
|---|---|---|---|
| 2003/0206596 A1* | 11/2003 | Carver | H04N 21/23424 375/240.26 |
| 2003/0226150 A1* | 12/2003 | Berberet et al. | 725/94 |
| 2003/0228140 A1* | 12/2003 | Bullock | H04N 5/76 386/241 |
| 2004/0143845 A1* | 7/2004 | Lin | H04N 7/17336 725/58 |
| 2005/0041679 A1* | 2/2005 | Weinstein et al. | 370/432 |
| 2005/0187879 A1* | 8/2005 | Zigmond et al. | 705/59 |
| 2008/0209491 A1* | 8/2008 | Hasek | H04N 7/17318 725/114 |
| 2009/0119594 A1* | 5/2009 | Hannuksela | G06F 17/3002 715/723 |
| 2011/0135283 A1* | 6/2011 | Poniatowki | H04N 5/76 386/297 |
| 2011/0208616 A1* | 8/2011 | Gorman | G06F 17/30743 705/27.1 |
| 2012/0284765 A1* | 11/2012 | Killick et al. | 725/111 |
| 2014/0282787 A1* | 9/2014 | Wirick et al. | 725/115 |

\* cited by examiner

SYSTEMS, METHODS, AND APPARATUS FOR ACCESSING RECORDINGS OF CONTENT ITEMS ON MULTIPLE CUSTOMER DEVICES

CROSS-REFERENCE TO RELATED APPLICATION

This application claims priority from U.S. Provisional Patent Application No. 61/791,493, entitled "Systems, Methods, and Apparatus for Accessing Recordings of Content Items on Multiple Customer Devices," filed Mar. 15, 2013. The priority application is incorporated by reference herein in its entirety.

FIELD OF THE DISCLOSURE

Embodiments of this disclosure relate generally to recording and viewing content items on multiple customer devices.

BACKGROUND OF THE DISCLOSURE

A wide variety of service providers, such as cable providers and satellite providers, provide broadband communication services, such as television programming services. Additionally, many customers utilize digital video recording (DVR) devices to record live linear broadcast content for subsequent viewing. Generally, a customer is only able to view recorded content items on the particular devices that are connected to the recording devices where the content items are stored, such as a DVR.

BRIEF DESCRIPTION OF THE DRAWINGS

Reference will now be made to the accompanying drawings, which are not necessarily drawn to scale, and wherein.

DETAILED DESCRIPTION OF THE DRAWINGS

Figure 1:
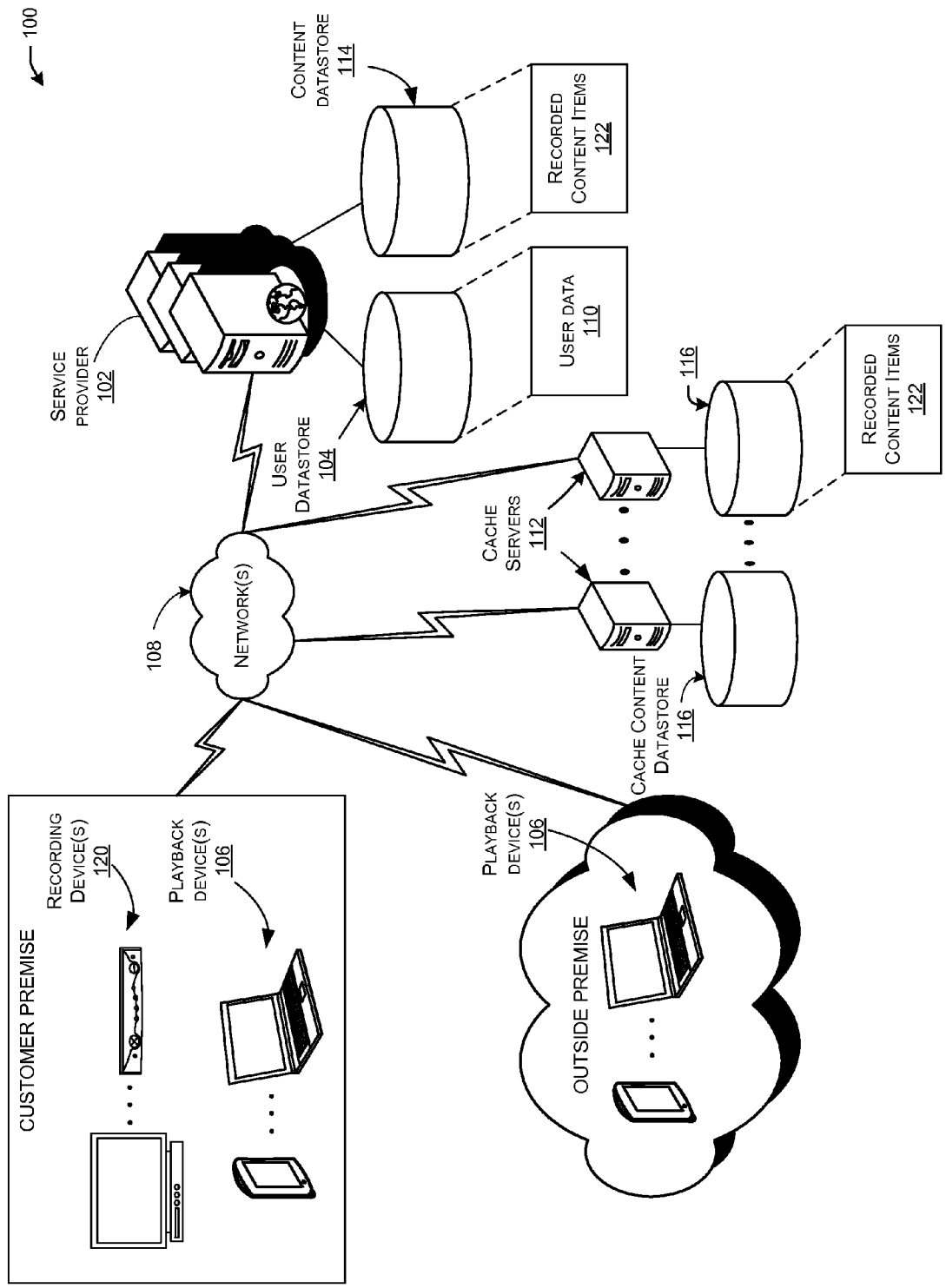
FIG. 1 illustrates a service provider system 100 for facilitating the recording of desired content items and the accessing of those recorded content items on various customer devices, according to at least one embodiment of the disclosure.

Embodiments of the disclosure now will be described more fully hereinafter with reference to the accompanying drawings, in which embodiments of the disclosure are shown. This disclosure may, however, be embodied in many different forms and should not be construed as limited to the embodiments set forth herein; rather these embodiments are provided so that this disclosure will be thorough and complete, and will fully convey the scope of the disclosure to those skilled in the art. Like numbers refer to like elements throughout.

As an overview, a service provider, such as a cable provider or a satellite provider, receives content and programming items from a variety of content providers for consumption on customer devices. These content items, also referred to as assets or programming items, may be recorded for later or delayed viewing on various customer devices, such as a digital video recorder (DVR) located at the customer premise. Further, a customer may have a number of different devices on which they would like to access (for example, view, that is, playback) the recorded content item, wherein the device utilized for the playback may be located outside the customer premise. Therefore, embodiments of the disclosure may include systems, methods and apparatuses for facilitating the access of content items recorded on a recording device by a different, potentially remote, playback device.

However, the service provider may enforce restrictions regarding the transmittal of content items from a recording device to a separate playback device. Because many of the content items and programming streams (such as broadcast channels) are owned, created, licensed or otherwise controlled by content providers, the service providers may be required to comply with certain restrictions pertaining to distribution to customers and/or providing access to the content items to customer. For example, the terms and conditions of the access rights of customers of the service provider system may state that a customer is authorized to record a portion of a content item on a recording device. Further, in this example, the customer may be restricted from accessing portions of content items not recorded and stored on the recording device. For instance, a licensing agreement with a content provider may be such that the service provider may only provide access to the recorded portion of a particular content item. As an example, if a recording device only records 45 minutes of a one-hour program, then, according to such a licensing agreement, the customer may only have access (e.g., playback rights) to the recorded 45 minutes of the program that was recorded. Therefore, when enabling access to the recorded content item, the service provider may need to ensure that the playback device has access to only the recorded portions of the content item.

A service provider system may utilize any number of different methods to enable or restrict the access of the recorded content items from the recording device to a playback device. In one example, the service provider system may retrieve the recorded content item from the recording device, and then transmit that version to the playback device. However, this may be inefficient and/or impractical. For example, the resolution of the recorded version may not be the same as or compatible with the resolution of the playback device. Similarly, the format of the recording may not be compatible with the player on the playback device. Transmitting the recorded content item may also use large amounts of network resources, e.g., bandwidth. Further, the service provider system may have a copy of the content item locally that may be more efficiently delivered to the playback device.

Accordingly, in one embodiment of the disclosure, the service provider system may, in response to a customer request to playback a recorded content item received from a playback device, determine where a playback version of the recorded content item may be located for delivery to the playback device. For instance, the service provider system may determine that the content item is stored locally with respect to the service provider, such as in connection with an application server (also referred to herein as the service provider server) of the service provider. However, the service provider system may be tasked with restricting access on the playback device to only the portion of the content item that was recorded on the recording device. Thus, in an embodiment, the service provider system may identify the portions of the content items that have been recorded, then aggregate a data file containing only the identified portions, and transmit that data file to the playback device. For example, the service provider system may store small files containing clips of the content item. The clips may be identified by a timestamp. The service provider system may assemble relevant clips that match the portions recorded on the recording device. The assembled clips may then be stored in a data file and transmitted to the playback device.

In an illustrative example, a customer may record a popular sporting event, such as a championship soccer game, on a recording device, such as the DVR in their home. To enable the recording, the customer may utilize an interactive programming guide (IPG) to locate and select the relevant program for recording. In some examples, various content items or programming items may be listed in an electronic programming guide (EPG). The customer may set recording instructions or preferences through the EPG. In one illustrative example, the customer's preferences may instruct the recording device to continue to record for a period of time, for example, 30 minutes, after the scheduled end of the program. Therefore, in the present example, the recorded content item for this particular customer may include the championship soccer game and 30 minutes of the program scheduled to begin after the end of the soccer game. After recording the content item on the recording device, the customer may want to view the content item on a different device referred to herein as a playback device, which in some embodiments may be located remote to the customer premise. In this situation, when the customer requests playback of the recorded content item on the playback device, the customer may be granted access to the portions of the programming comprising the customer's unique copy of the recorded content item stored on the recording device. The customer's unique copy in this example may include the championship soccer game, which is scheduled to last 90 minutes, and 30 minutes of the program scheduled at the end of the soccer game, or 120 minutes of total recorded content. However, in another example, a second customer may have scheduled to record just the championship soccer game, and that customer's unique copy would include only the 90 minutes of the scheduled program.

In both of these examples, the customer's access rights may be restricted to only the portion of the content item that has been recorded by the recording device, which may be based on a content-provider restriction or terms of licensing. Therefore, in some embodiments, the access criteria may dictate that the content item that can be presented on the playback device is the same as the content item that has been recorded by the recording device (e.g., having the same start point or time and the same end point or time). One illustrative way to enforce the access rights associated with a content item is to retrieve a physical copy of the content item from the recording device and transmit it to the playback device. However, in certain implementations, because content items are often audio-visual, they may comprise large data files, and retrieving a copy from the recorded device may utilize a significant amount of data transmission bandwidth. In other embodiments, it may also be possible to restrict the access on playback by retrieving identifiers from a recording device, wherein the identifier may identify the content item, recording length, start-time, end-time, channel identifier, etc. Based on such identifiers, the service provider system may be able to generate or reconstruct a playback copy of the recorded content item stored on the recording device using a copy of the content item stored within the service provider system, for delivery to the playback device. Thus, in certain embodiments, based on an identifier associated with the recorded content item, the service provider may identify which portion of the content item was recorded on the recording device, and transmit only the identified portion of the content item to the playback device. In an embodiment, the portions of the content item utilized may be stored locally to an application server of the service provider. Therefore, a customer's unique copy of a recorded content item may be replicated by the service provider system.

In an illustrative example, a customer may have recorded the first 20 minutes of a one-hour program. However, the recording device may have been unable to record the next 20 minutes of the one-hour program for any number of reasons. Further, the recording device may have resumed the recording of the content item for the last 20 minutes of the one-hour program. In this example, the service provider needs to retrieve stored portions and reconstruct a unique copy of the content item (that is, a unique copy that corresponds to the portion of the content item that is recorded on the recording device). Therefore, various portions of the content item associated with the first 20 minutes and the last 20 minutes may be retrieved by the service provider from a local datastore and concatenated to generate a playback version of the recorded content item that is essentially the same as the copy located in the recording device.

In other embodiments, copies of many content items may be respectively stored by a plurality of cache servers within the service provider system, sometimes referred to as edge servers. In such cases, the service provider may direct the cache server to reconstruct a playback version of the recorded content item based on the identifier associated with the recorded content item, as may be received from the recording device, and then transmit the playback version to the playback device. This may be desirable in certain implementations, such as when the cache server is underutilized compared to the service provider server, or where the cache server has more available bandwidth, or when the content (or an appropriate version, format, resolution, etc.) of the content item is not stored locally at the service provider server.

According to further embodiments of the disclosure, the service provider may direct the storage of various content items to the cache servers, for example, based at least in part on the popularity of a content item, time, geographic location, number of recording requests, number of user download requests, etc. For instance, if a content item is popular, copies of the content item may be distributed to more than one cache server associated with the service provider system. In certain embodiments, some cache servers may service certain geographic areas of a service provider system. Further, the caching at the cache servers may be based at least in part on the popularity of certain content item formats and delivery techniques.

A wide variety of different types of customer devices (e.g., recording devices and playback devices) may be utilized, as desired in various embodiments of the disclosure. Examples of suitable customer devices include, but are not limited to, customer premise devices (e.g., set-top boxes, etc.), tablet computers, smartphones, gaming consoles, laptop computers, desktop computers, personal computers, or mobile devices. In some embodiments, two customer devices may be unconnected, and/or located either at the customer premise or remote to the customer premise.

As desired, a wide variety of suitable methods and/or techniques may be utilized to facilitate access to playback versions of the unique copies of a recorded content item. In one illustrative embodiment, a playback version of the recorded content item may be generated by concatenating extracted stored portions of the content items from either a datastore associated with the service provider server or a cache server(s) in the service provider system. Another method may include generating a manifest file with only those portions of the content item that were recorded, with perhaps additional content added by the service provider, and sending that file to the playback device where the file referenced in the manifest file may be retrieved by the playback device from a cache server or service provider server datastore. Yet another method may include the streaming of the playback version to the playback device.

FIG. 1 illustrates a service provider system 100 for facilitating the recording of desired content items and the accessing of those recorded content items on various customer devices, according to at least one embodiment of the disclosure. The system 100 may include, for example, one or more service provider servers 102 (known hereinafter as service provider 102) and associated datastores 104 and 114. Further, the service provider system 100 may communicate with customer devices, such as one or more recording devices 120 and/or one or more playback devices 106. The recording devices 120 may include any number of devices such as a set-top box, a DVR, TIVO™, or other digital recording devices. The playback devices 106 may include any number of devices such as set-top boxes, televisions, web-televisions, satellite receivers, computers, smartphones, laptop computers, or tablets. The interaction between service provider server 102 and the customer devices may be through one or more networks 108 (known hereinafter as network 108). Although two devices are shown for the recording and playback, such devices may be combined into a single device, and the recording device 120 may perform the function of the playback device 106, or the playback device 106 may perform the function of the recording device 120.

Any number of suitable networks 108 may facilitate communications between various components of system 100. Examples of such networks may include, but are not limited to, one or more service provider networks (e.g., a cable network, a satellite network, etc.) and/or other networks. Network 108 may include any telecommunication and/or data networks, whether public, private, or a combination thereof, including but not limited to, a local area network, a wide area network, an intranet, the Internet, public switched telephone networks, satellite networks, cable networks, and/or any combination thereof and may be wired and/or wireless.

The service provider system 100 may include any number of systems or devices (some of which may not be illustrated) that facilitate the output of a broadband signal for receipt by various customer devices, including recording devices 120 and playback devices 106. For example, service provider system 100 may include systems associated with a cable service provider, a satellite service provider, or other service provider. In operation, service provider server 102 may receive content from one or more content providers, format the content for output in a broadband signal, and/or output the broadband signal. Examples of suitable systems that may be associated with the broadband source include, but are not limited to, a service provider head-end component, a conditional access system controller, any number of encryption devices, an electronic program guide data server, an on-demand server, a pay-per-view purchase server, etc.

According to another aspect of the disclosure, the service provider system 100 may facilitate the processing, communication and delivery of content items to various customers for playback. The service provider system 100 may include a wide variety of resources that facilitate or direct the caching of any number of content items based at least in part on the demand or popularity of the content item. For example, demand may be determined at least in part from the total number of customer record requests for the content item.

The service provider system 100 may further include one or more datastores 104 and 114 in communication with the service provider server 102. For example, the content datastore 114 may provide for local storage of various recorded content items 122 for subsequent retrieval for playback. In addition, the user datastore 104 may provide for local storage of user-related data 110, such as account information, information relating to customer recorded content, such as identifiers, etc.

Further, the service provider system 100 may include local or remotely located cache servers 112, which may be utilized in the storage and transmission of the content items 122. For example, the content items 122 may be stored at one or more cache servers 112, for example, at a cache content datastore 116 associated with a cache server 112. This may allow for more rapid access and download of recorded content items 122 to customer devices 106. For example, by placing cache servers 112 at different geographic locations within a service provider system 100 and caching the most popular content items at the cache servers 112, the load on the networks 108 may be reduced and/or distributed, and the content item may be downloaded more rapidly and efficiently by a customer from a cache server 112 that is located relatively close geographically to the customer and/or is experiencing less traffic (e.g., processing fewer content playback requests).

One or more components of the systems and one or more elements of the methods described herein may be implemented through an application program running on an operating system of a computer. They also may be practiced with other computer system configurations, including handheld devices, multiprocessor systems, microprocessor based, or programmable consumer electronics, mini-computers, main computers, etc.

Application programs that are components of the systems and methods described herein may include routines, programs, components, data structures, etc. that implements certain abstract data types and perform certain tasks or actions. In a distributed computing environment, the application program (in whole or in part) may be located in local memory, or in other storage. In addition, or in the alternative, the application program (in whole or in part) may be located in remote memory or in storage to allow for circumstances where tasks are performed by remote processing devices through a communication network.

Additionally, as desired, one or more components of system 100 may be processor-driven components or devices. System 100 shown in FIG. 1 is provided by way of example only. Numerous other operating environments, system architectures, and device configurations are possible. Accordingly, embodiments of the present disclosure should not be construed as being limited to any particular operating environment, system architecture, or device configuration.

Figure 2:
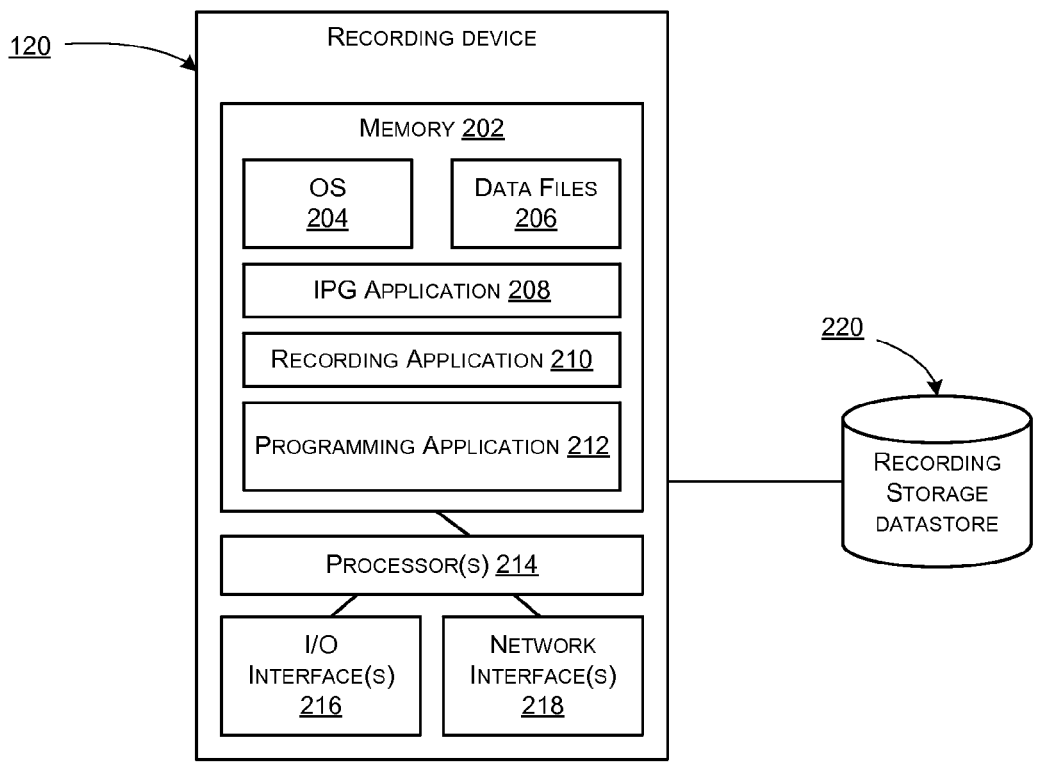
FIG. 2 is a schematic block diagram illustrating a recording device according to at least one embodiment of the disclosure.

FIG. 2 is a schematic block diagram illustrating a recording device according to at least one embodiment of the disclosure. The recording device 120 may be associated with a customer of the service provider system 100 (e.g., a cable service provider, a satellite service provider, etc.). In some embodiments, a single customer may be associated with a single recording device 120, though there also may be multiple recording devices associated with the customer.

The recording device 120 may be a suitable device or component that facilitates the receipt, processing, and/or output of at least one broadband signal, such as a broadband cable signal or a broadband satellite signal. Additionally, the recording device 120 may facilitate the receipt and processing of user requests to record content items. In certain embodiments, recording device 120 may be a customer premise device or a component that is situated within a customer's household or other structure associated with the customer. The recording device 120 may include suitable hardware and/or software components capable of receiving and processing a broadband signal (e.g., a cable signal, a satellite signal, etc.) output by a service provider server 102, such as a cable service provider system or a satellite service provider system. Examples of suitable programming processing components include, but are not limited to, a set-top box (STB) (e.g., a cable STB, a digital satellite STB, an Internet Protocol Television STB, etc.), a virtual STB, an embedded STB, etc.

In operation, recording device 120 may receive at least a portion of a broadband data signal output by a service provider server 102, and the recording device 120 may convert at least a portion of the received signal into content that may be displayed or otherwise output by a user interface associated with recording device 120, such as a display and speakers. Following receipt of a recording request, the recording device 120 may be configured to record a content item. In one illustrative example, the recording device 120 may transmit identifiers associated with the record request and/or recorded content item 122 to the service provider server 102. In other examples, the recording device 120 may transmit recorded content item 122 to the service provider server 102. As desired, the recording device 120 may receive a broadband data signal and/or content items via any number of suitable service provider networks 108, such as a cable network that includes any number of optical fibers, coaxial cables, and/or cable drops, a satellite network that includes a suitable satellite dish and/or connecting cables, and/or other suitable networks. Additionally, any number of intermediary devices, such as broadband modems, routers, etc., may be situated between the service provider server 102 and the recording device 120.

As desired, the broadband signal provided to recording device 120 may include a wide variety of data components, including but not limited to, a television signal, a digital television signal, data associated with a VoIP telephone service, data associated with Internet service, data associated with home monitoring services, etc. The recording device 120 may receive and process the broadband signal. Additionally, in certain embodiments, the recording device 120 may selectively store recorded content items 122 in one or more suitable storage devices, such as recording storage datastore 220, which may comprise memory that is external to the recording device 120, but directly accessible, such as an external hard drive. Additionally, in certain embodiments, recording device 120 may output audio data to any number of audio components, such as a home theater system, stereo system, etc.

The memory 202 and recording storage datastore 220, whether removable and/or non-removable, are all examples of computer-readable storage media. For example, computer-readable storage media may include volatile and/or non-volatile, removable and/or non-removable media implemented according to any method or technology for storage of information such as computer-readable instructions, data structures, program modules, and/or other data.

Recording device 120 may be any suitable processor-driven device that facilitates the receipt, processing, and/or output of a broadband signal. Additionally, recording device 120 may be a suitable processor-driven device that facilitates the receipt and processing of user commands to record content items and the processing of the recorded content, including in certain embodiments the transmission of identifiers associated with the recorded content item to the service provider server 102. The execution of suitable computer-implemented instructions or computer-executable instructions by recording device 120 may form a special purpose computer or other particular machine that is operable to facilitate the processing of recording commands and/or the processing and output of broadband content (including downloaded recorded content).

With continued reference to FIG. 2, each recording device 120 may include one or more processors 214, one or more memories 202, one or more transceivers and/or network interfaces 218, and/or one or more input/output (I/O) interfaces 216. The processors 214 may be configured to execute any number of software applications and/or computer-readable or computer-executable instructions. The memory 202 may include any number of suitable memory devices, such as caches, read-only memory devices, random access memory devices, flash memory devices, magnetic storage devices, removable storage devices (e.g., memory cards), etc. The memory 202 may include internal memory devices and/or external memory devices in communication with recording device 120. The memory 202 may store data, executable instructions, and/or various program modules utilized by processors 214. Examples of data that may be stored by the memory devices 202 include data files 206, recorded content items 122 (e.g., downloaded recorded content, locally recorded content, etc.), and/or any number of suitable program modules that may be executed by the processors 214, such as an operating system (OS) 204, interactive program guide (IPG) application 208, recording application 210, and/or programming application 212. In certain embodiments, the recorded content items 122 may be stored on a device external to, but in communication with, the recording device 120, for instance, the recording storage datastore 220.

The data files 206 may include any suitable data that facilitates the operation of recording device 120, the processing of a received broadband signal, the receipt of recording requests, the processing of recording requests, the recording of content items and/or the processing of recorded content items. For example, data files 206 may include, but are not limited to, user profile information, information associated with requests to record content items, or information associated with service provider 102. In certain embodiments, data associated with the recorded content items, such as recording identifiers, may also be stored in data files 206 and/or with the recorded content item itself.

The OS 204 may be any suitable software module that controls the general operation of recording device 120. The OS 204 may also facilitate the execution of other software modules, for example, IPG application 208, recording application 210 and/or programming application 212. IPG application 208 may be a suitable software module that facilitates the processing of program guide information received by recording device 120. For example, electronic program guide (EPG) information may be included in a broadband signal received by recording device 120. IPG application 208 may format at least a portion of the received EPG data for presentation to a customer via an IPG grid. For example, received EPG data may be parsed and organized by channel and time slot. The organized data may then be formatted for display in an IPG grid. For example, based upon the receipt of a user command or request for IPG data, such as a selection of a remote control button or option associated with requesting guide data, IPG application 208 may direct the output of the IPG grid for presentation to a display through I/O interface 216. In one embodiment, EPG information may also be formatted to display a listing of recordings or a listing of content recommended to a customer, and may be presented in any number of formats to the customer.

Once presented to a user, the user may navigate through a displayed IPG grid in order to view the scheduled content, such as current and upcoming television content. For example, the user may utilize a remote control to navigate through the IPG grid. As desired, the user may utilize the IPG grid to request the recording of desired content items. For example, the user may select an individual entry for a content item included in the grid, and the user may request that the content item associated with the grid entry be recorded. A recording request made by the user may be received by IPG application 208 and provided to recording application 210. IPG application 208 may prompt the customer with a start time and an end time. The customer may have the option of terminating the recording upon the end of the scheduled programming time, or alternatively, the customer may extend the recording past the scheduled programming time. For example, the customer may select the option of extending the record time five, ten, twenty, or thirty minutes after the scheduled end of the programming, as may be defined by the IPG.

The recording application 210 may be any suitable software module that facilitates the recording of content items on behalf of a customer. In operation, recording application 210 may receive a customer's command or request to record a content item. In certain embodiments, a command to record the content item may be received via a user's interaction with an IPG grid. In other embodiments, the command to record content item may be received via one or more suitable networks 108, through network interface 218.

For example, a customer may utilize another suitable customer device (e.g., a personal computer, a mobile device, etc.) to access, for example, a web-based application hosted by service provider server 102, and the user may request, via the web-based application, that a content item be recorded. Service provider server 102 may then communicate the recording request to recording device 120 via one or more suitable networks 108. As yet another example, a customer may utilize the recording device 120 to directly access the recording application 212.

In one embodiment, upon recording a content item 122, recording application 210 may generate a communication associated with recorded content item 122, referred to herein as a recording identifier. A wide variety of information may be included in the recording identifier, such as an identifier of the recording device 120, an identifier of the recorded content item, an identifier of the customer, customer account information, a priority and/or time markers. The recording identifier may generally include information that facilitates the subsequent delivery of a playback version of the recorded content item 122 stored on the customer's recording device 120 to the customer's playback devices 106. The service provider server 102 may utilize the recording identifier and/or any required access credentials to facilitate the transmission of the recorded content item 122 to the playback device 106. In certain embodiments the recording identifier may be stored in data files 206. Further, the transmission of the recording identifier to the service provider server 102, where it may be stored for later use in processing a request for content playback, may be initiated by the recording application 210 at the completion of the recording process, or it may be in response to a request from the service provider server 102, such as in response to a playback request for the recorded content item.

With continued reference to FIG. 2, the programming application 212 may be a suitable software module that facilitates the processing and/or output of received broadband content, downloaded recorded content, and/or stored content. For example, programming application 212 may be configured to format at least a portion of a content item for output by devices 106 or 120. A wide variety of content items may be formatted for output by programming application 212 as desired in various embodiments of the disclosure including, but not limited to, television content, audio content, VoIP telephone content, electronic program guide data, Internet and/or website content, etc. Additionally, the programming application 212 may be configured to receive and process user commands associated with the output of a content item. For example, the programming application 212 may be configured to process user commands received via remote control input and/or user voice commands.

With continued reference to the recording device 120, the one or more I/O interfaces 216 may facilitate communication between the recording device 120 and one or more input/output devices, for example, one or more user interface devices, such as a remote control, display, keypad, mouse, pointing device, control panel, touch screen display, microphone, speaker, etc., that facilitate user interaction with the recording device 120. In this regard, commands may be received by the recording device 120. One or more network interfaces 218 may facilitate connection of the recording device 120 to one or more suitable networks 108, distribution networks, or broadband networks (e.g., a cable network or a satellite network) and/or local area networks (e.g., a Bluetooth®-enabled network, a WI-FI enabled network, etc.). In this regard, the recording device 120 may receive a broadband signal for processing and output. Additionally, the recording device 120 may communicate commands, data (e.g., recording identifiers) and/or requests to the service provider server 102. The recording device 120 may receive commands and/or information from service provider server 102.

Figure 3:
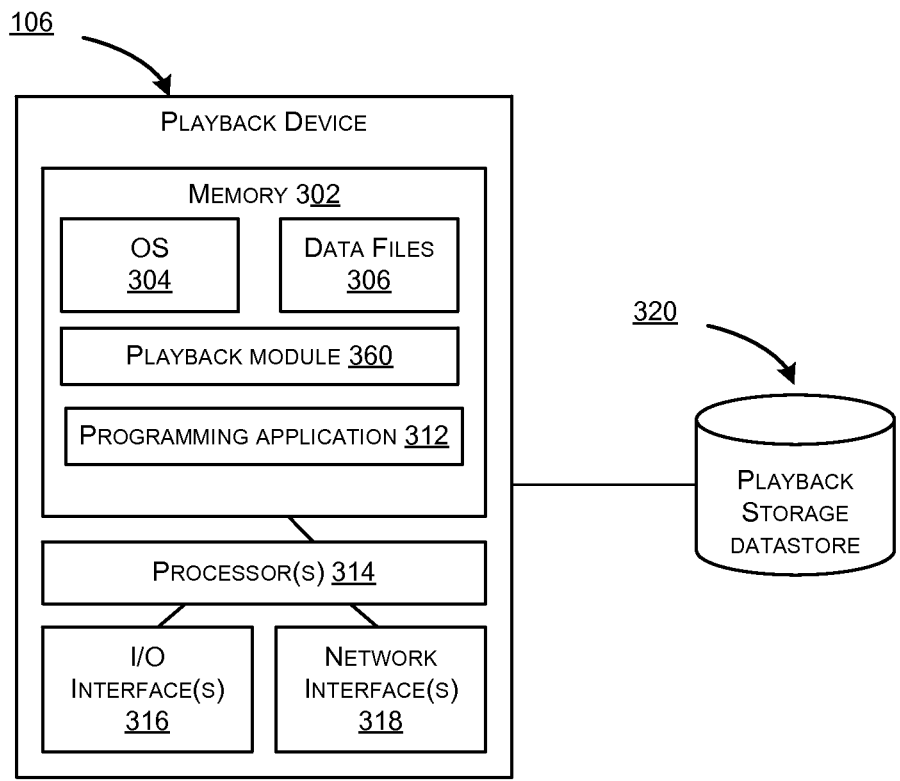
FIG. 3 is a schematic block diagram of a playback device 106, according to at least one embodiment of the disclosure.

FIG. 3 is a schematic block diagram of a playback device 106, according to at least one embodiment of the disclosure. The playback device 106 may be associated with a customer of the service provider system 100 (e.g., a cable service provider, a satellite service provider, etc.). Multiple playback devices associated may be associated with one customer.

Playback device 106 may include at least one memory 302 and one or more processing units (or processor(s) 314). Processor(s) 314 may be implemented as appropriate in hardware, software, firmware, or combinations thereof. Software or firmware implementations of processor(s) 314 may include computer-executable or machine-executable instructions written in any suitable programming language to perform the various functions described. Similarly, hardware implementations of processor(s) 314 may be configured to execute computer-executable or machine-executable instructions to perform the various functions described.

The memory 302 may store program instructions that are loadable and executable on processor(s) 314, as well as data generated during the execution of these programs. Depending on the configuration and type of playback device 106, memory 302 may be volatile (such as random access memory (RAM)) and/or non-volatile (such as read-only memory (ROM), flash memory, etc.). Playback device 106 may also include additional removable storage and/or non-removable storage including, but not limited to, magnetic storage, optical disks, and/or tape storage. The disk drives and their associated computer-readable media may provide non-volatile storage of computer-readable instructions, data structures, program modules, and other data. In some implementations, memory 302 may include multiple different types of memory, such as static random access memory (SRAM), dynamic random access memory (DRAM), and/or ROM.

Playback device 106 may also include additional storage, such as playback storage datastore 320, which may include removable storage and/or non-removable storage. The datastore 320 may include, but is not limited to, magnetic storage, optical disks, and/or tape storage. The disk drives and their associated computer-readable media may provide non-volatile storage of computer-readable instructions, data structures, program modules, and other data for the computing devices. In some embodiments, playback storage datastore 320 may include multiple different types of memory, such as static random access memory (SRAM), dynamic random access memory (DRAM), and/or ROM.

The memory 302 and/or the datastore 320, whether removable and/or non-removable, are all examples of computer-readable storage media. For example, computer-readable storage media may include volatile and/or non-volatile, removable and/or non-removable media implemented according to any method or technology for storage of information such as computer-readable instructions, data structures, program modules, and/or other data.

The playback device 106 may also include one or more network interface(s) 318 that allows the playback device to communicate with home networks, wireless networks, distribution networks, and other computing devices, servers, or user terminals. For example, the playback device 106 may utilize network interface(s) 318 to communicate with the service provider server 102, the remote cache servers 112, or the recording device 120.

The playback device 106 may also include input/output (I/O) interface(s) 316, for interacting with a user, such as via a keyboard, a mouse, a pen, a voice input device, a touch input device, a display, speakers, a camera, a microphone, a printer, etc. The I/O interface(s) 316 may provide any type of interface for receiving input including a graphical user interface, a command line interface, a haptic interface, an auditory interface, and so forth.

The I/O interface(s) 316 may be used to consume a recorded content item (e.g., a playback version of the recorded content item) on the playback device 106. For example, a display that is physically or wirelessly connected to the playback device 106 may be used to view the content item, while an audio output may be used to provide audio associated with the recorded content item. The I/O interfaces 316 also may be used to authenticate a user/customer using, for example, biometric information.

Turning to the contents of memory 302 in more detail, the memory 302 may include an operating system (O/S) 304 and one or more application programs or services for implementing the features disclosed herein, including at least playback module 360, which may in certain embodiments comprise one or more of a web-based browser application, a dedicated software application (e.g., a smartphone application, a tablet application, etc.), or the like. A user/customer may use the playback module 360 to view and interact with the recorded content items.

The playback module 360 may provide various types of functionality to the user such as pausing, playing, rewinding, identifying the content marker, and/or providing input via a tactile or auditory interface. In one example, a customer may use the playback module 360 to select a recorded content item for playback and the playback module 360 may then facilitate playback of the selected recorded content item via the playback device 106. For example, the playback module 360 may interact with the service provider server 102 to acquire a list of recorded content items available for playback on the playback device 106. The user/customer may then select a recorded content item for playback, which may result in the service provider delivering a playback version of the recorded content item to the playback device 106. A programming application 312 may then take the delivered content items and render the content to the user/customer via the playback device 106.

The programming application 312 may be a suitable software module that facilitates the processing and/or output of received broadband content, downloaded recorded content, and/or stored content. For example, programming application 312 may be configured to format at least a portion of a content item for output by the playback device 106. A wide variety of content items may be formatted for output by programming application 312 as desired in various embodiments of the disclosure including, but not limited to, television content, audio content, VoIP telephone content, electronic program guide data, Internet and/or website content, etc. Additionally, the programming application 312 may be configured to receive and process user commands associated with the output of a content item. For example, the programming application 312 may be configured to process user commands received via remote control input and/or user voice commands.

Figure 4:
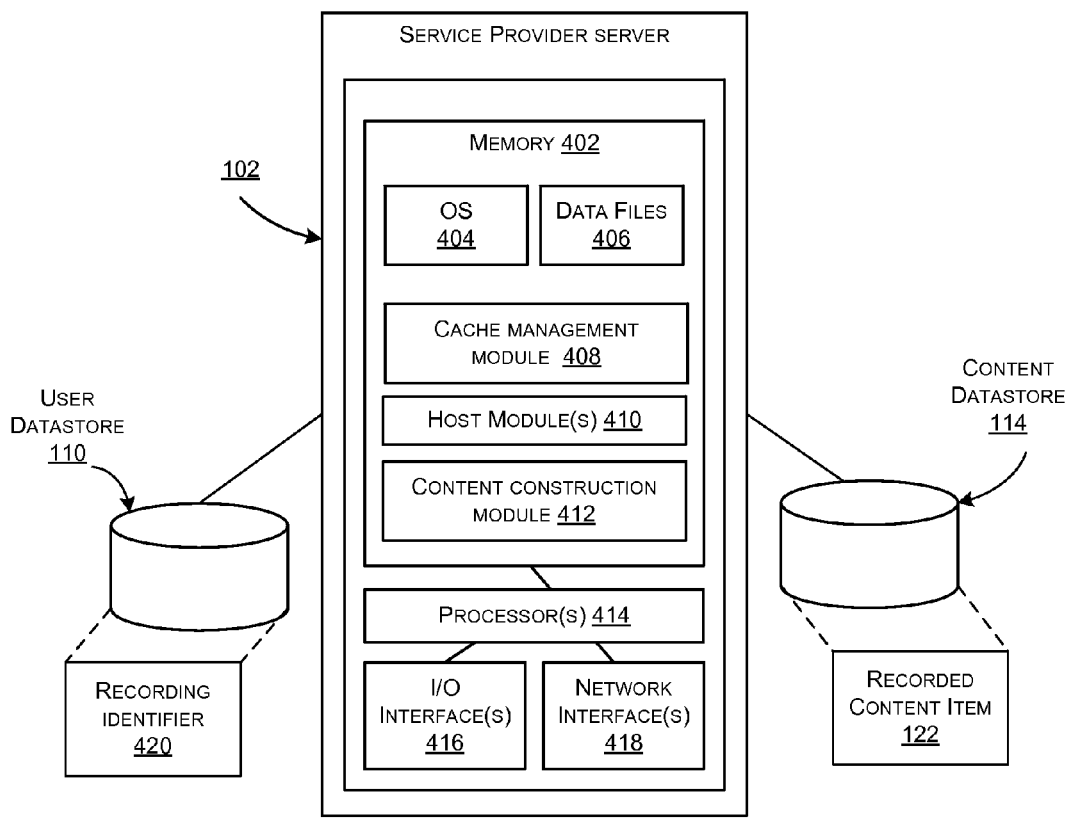
FIG. 4 is an illustrative embodiment of a service provider server 102, according to at least one embodiment of the disclosure.

FIG. 4 is an illustrative embodiment of a service provider server 102, according to at least one embodiment of the disclosure. This may include any number of systems and/or devices that facilitate the output of a broadband signal for receipt by any number of devices 106, 120.

The service provider server 102 may include one or more processors 414, and comprises any suitable processor-driven device configured to receive and process requests to record desired content items. Examples of suitable processor-driven devices that may be utilized include, but are not limited to, a server computer, a personal computer, a digital assistant, a personal digital assistant, a digital tablet, a smartphone, an Internet appliance, an application-specific circuit, a microcontroller, a minicomputer, any other processor-based device, and/or any combination of processor-driven devices. The execution of suitable computer-implemented instructions or computer-executable instructions by service provider server 102 may form a special purpose computer or other particular machine that is operable to facilitate the receipt of requests to retrieve recorded content items, the processing of received retrieval requests, the reconstruction of the recorded content items, and/or the communication of the recorded content items to the playback devices 106.

In addition to one or more processors 414, the service provider server 102 may include one or more memory devices 402, one or more input/output (I/O) interfaces 416, and/or one or more network interfaces 418. The processor 414 may be configured to execute any number of software applications and/or computer-readable or computer-executable instructions. The memory 402 may include any number of suitable memory devices, such as caches, read-only memory devices, random access memory devices, flash memory devices, magnetic storage devices, etc. The memory 402 may store data, executable instructions, and/or various program modules utilized by the processor 414. Examples of data that may be stored by the memory 402 may include user data files 406, which may include recording identifiers associated with a user/customer, and recorded content items 122. Additionally, the memory 402 may be configured to store any number of suitable program modules that may be executed by processor 414 such as an operating system (OS) 404, cache management module 408, one or more host modules 410, and/or content construction module 412.

The data files 406 may include any suitable data that facilitates the operation of service provider server 102, for example the receipt of recording requests, the processing of recording requests, the recording of desired content items, and/or the communication of recorded content items to playback devices 106. For example, data files 406 may include, but are not limited to, information that facilitates communication with any number of devices 106, 120, information associated with received recording requests, information that facilitates the requests from one or more customer devices 106, information associated with recorded content items, unique identifiers generated in association with recorded content items, information associated with the processing of and reconstruction of the recorded content items, information associated with portions of the content items to be uniquely processed on behalf of customers, information associated with the reconstruction of recorded content items, and/or information associated with the communication of recorded content items 122 to playback device 106. Illustrative data that may be stored may be user data such as customer account information, customer device identification, identification of recorded content items, recording identifiers, user account information, access rights for various content items, and access rights associated with a user account. In addition and/or in the alternative, user data may be stored at the user datastore 110, including the recording identifiers 420 associated with each user/customer.

The OS 404 may be any suitable software module that controls the general operation of service provider server 102. The OS 404 may also facilitate the execution of other software modules by the processors 414, for example, cache management module 408, the one or more host modules 410, and/or content construction module 412. The one or more host modules 410 may be any suitable software modules that facilitate the establishment of a communications session with one or more devices 106, 120. In this regard, service provider server 102 may receive one or more requests for retrieving content items from a playback device 106. For example, recording requests may be received over the network 108 (e.g., a cable network, a satellite network, etc.) from a device 106, 120 via a communications session established by a host module 410. As another example, a host module 410 may facilitate the establishment of a network session, such as a web-based network session, with a device 106, 120 (e.g., a personal computer, a mobile device, etc.). During an established network session, a customer request to record a content item may be received from a recording device 120 or playback device 106. In certain embodiments, the received request may be forwarded, by the host modules 410, to an associated recording device 120. In other embodiments, for example, a customer request to playback a recorded content item may be processed by the content construction module 412 to facilitate the access of a recorded content item 122 by a playback device 106.

The cache management module 408 may be a suitable software module that facilitates the process of allocating content items to cache servers 112. In operation, the cache management module 408 may determine the allocation of various content items among a plurality of cache servers 112. For example, certain types of content items may be more popular, and thus different content items may be placed in different cache servers 112 according to popularity, location of the customer(s), total number of requests that customers initiate to retrieve recorded content items 122, etc. The cache management module 408 may determine a schedule for which different recorded content items 122 are maintained at which of the different cache servers 112 in the service provider system 100. For example, a popular recorded content item 122 may be located at many cache servers 112, while a less popular content item may be located at only one or two cache servers 112.

Additionally, in certain embodiments, the cache management module 408 may monitor the duration of time for which copies of the recorded content item may be stored either at service provider server 102 or at one or more cache servers 112. For example, the cache management module 408 may delete a stored content item if the content item is not requested for download for a predetermined period of time (e.g., a week, a month, etc.). Various cache servers 112 may be given different priorities for storing copies of recorded content items 122. The priorities may be based on various criteria such as the popularity of the content items, how recently the content items were broadcast, etc.

Content construction module 412 may be a suitable software module that facilitates the processing of playback requests for a recorded content item 122 and the transmission of the recorded content item 122 (e.g., a playback version of the recorded content item) to the requesting playback device 106. For instance, upon receiving a playback request, the content construction module 412 may retrieve one or more recording identifiers associated with the user/customer for the recorded content item 122 from either the recording device 120, data files 406, or user datastore 110. In certain embodiments, the recording identifier may include a recording time, time markers, a content name, a channel, an identifier of the program, and a recording date among other parameters. Additionally, information associated with the customer account may be included therein or sent with the recording identifier.

As an example, when a request for retrieving a recorded content item 122 has been received by service provider server 102, the content construction module 412 may direct the reconstruction and transmission of the recorded content item (e.g., a playback version of the recorded content item, with the same start and stop times, for example) to the playback device 106. The content construction module 412 may determine a location associated with the storage of recorded content item 122 from which the content item will be retrieved. Such a determination may depend on factors including network bandwidth, type/version of the requesting playback device (e.g., audio/video capabilities and specifications), location of the requesting playback device, amount of processing necessary to convert the content item into a playback version (e.g., modifying start and stop times that match that of the recorded content item on the recording device 120, and/or injecting new content that may be added to the playback version by the service provider), or other data included in the associated recording identifier. The determined storage location may be, for example, the content datastore 114, or a datastore associated with one of cache servers 112. In some instances, content construction module 412 may retrieve the content item from recording device 120.

According to an aspect of the disclosure, content construction module 412 may direct and/or facilitate the identification and reconstruction of a playback version of recorded content item 122 on behalf of a respective customer that requested playback of the recorded content item 122 on a playback device 106. For example, content construction module 412 may identify one or more portions of recorded content item 122 that are compatible with the capability of the playback device 106 (e.g., screen resolution). The identified one or more portions may be extracted from either a storage (such as content datastore 114) on service provider server 102 or one or more cache servers 112, and the playback version comprising the one or more portions may be transmitted to the playback device 106. While the service provider server may retain a copy of the playback version, the content construction module 412 may upon request of the customer, after a predetermined period of time, and upon reaching a storage capacity associated with the customer account, etc., delete the playback version of recorded content item 122 that is associated with the customer account.

As desired, a wide variety of suitable methods and/or techniques may be utilized by content construction module 412 to facilitate the delivery of unique portions of recorded content item 122. Once portions of a content item have been retrieved from various storage media, the content item may be reconstructed to create a playback version of recorded content item 122. As may be the case, each of the retrieved portions may have any desired size, duration, or length. The retrieved portions may include portions of other programs based at least in part on a recording preference. In addition, some or all of the functionality of the content construction module 412 may be implemented at various points in the service provider system 100, including the cache servers 112. Accordingly, the reconstruction of the recorded content item into a playback version may be performed at a cache server 112.

Because each copy of the playback version of the recorded content item has been processed in a manner specific to a respective customer or a respective customer account, the playback device 106 associated with customer account may be granted access rights to retrieve and view playback version. In other words, a reconstructed copy of the requested content item, which is formed by merging the processed (e.g., encrypted) extracted portions of one or more content items, may be retrieved only by a customer account that has a recorded copy of the content item on recording device 120. For example, if a customer has recorded only twenty minutes of the content item on recording device 120, then playback device 106 may be granted access rights to only the recorded twenty minutes of the content item.

One example of the operations that may be performed in accordance with an embodiment of the disclosure will be described in greater detail below with reference to FIGS. 5-9.

Figure 5:
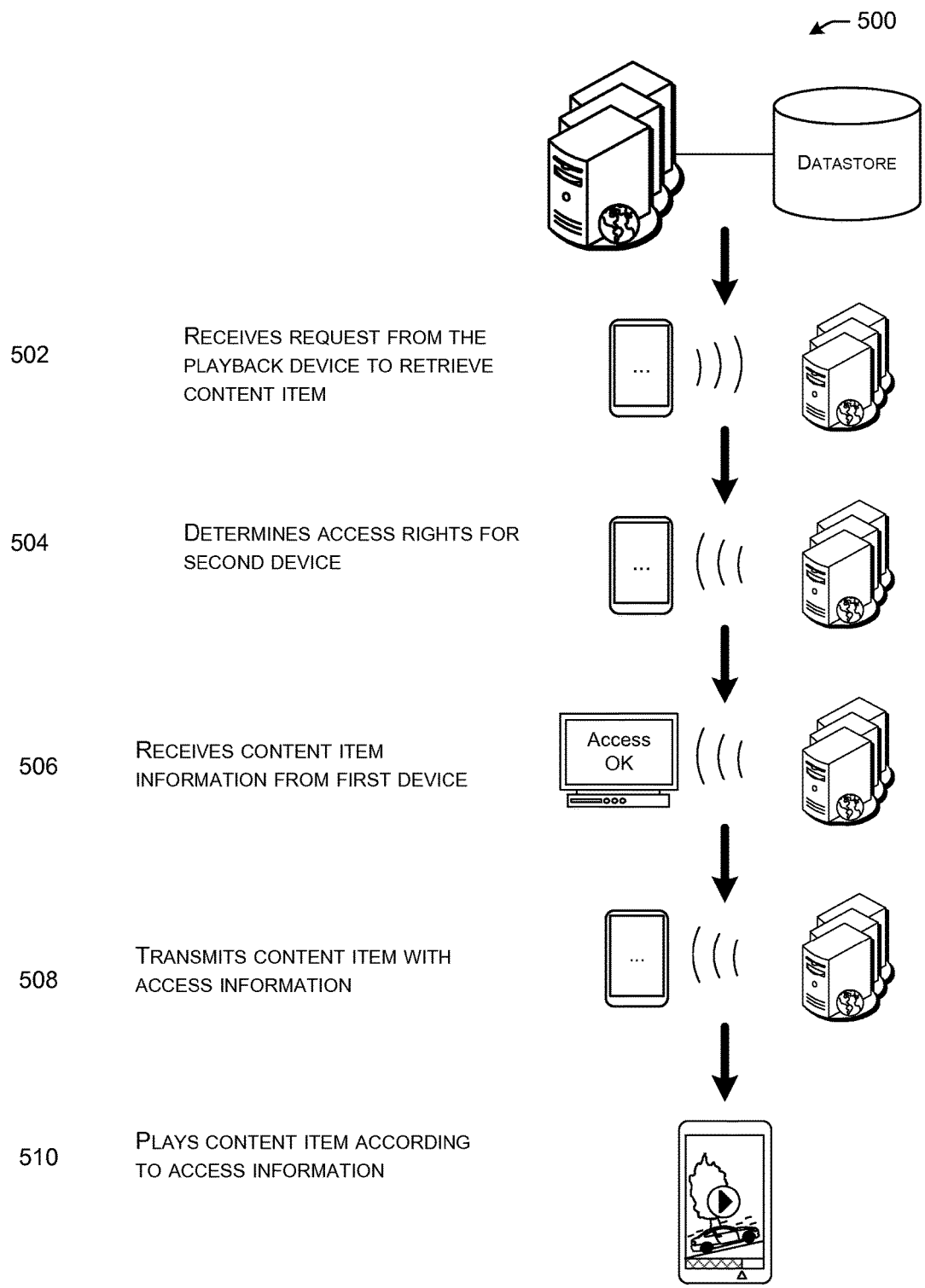
FIG. 5 illustrates a flow diagram of exemplary method 500 that may be performed by a service provider server 102 to facilitate the transmission and delivery of a recorded content item to a playback device, according to at least one embodiment of the disclosure.

With reference to FIG. 5, the one or more I/O interfaces 416 on service provider server 102 may facilitate communication between network 108 and, for example, one or more user interface devices, such as a display, keypad, mouse, pointing device, control panel, touch screen display, remote control, microphone, speaker, etc., that facilitate user interaction with service provider server 102. The user commands may be received by service provider server 102. The one or more network interfaces 418 may facilitate connection of service provider server 102 to one or more suitable networks 108, for example, a broadband network or service provider network (e.g., a cable network, a satellite network, etc.) that facilitates communication with recording device 120 and/or one or more networks that facilitate communications with any number of customer devices 106, 120.

The example flow diagram shown in FIG. 5 is provided by way of example only. Numerous other operating environments, system architectures, and device configurations are possible. Accordingly, embodiments of the present disclosure should not be construed as being limited to any particular operating environment, system architecture, or device configuration.

FIG. 5 illustrates a flow diagram of exemplary method 500 that may be performed by a service provider server 102 to facilitate the transmission and delivery of a recorded content item to a playback device, according to at least one embodiment of the disclosure. The operations of method 500 may be performed by a suitable host module and/or network recording module associated with a content recording server, such as the host module 410 and/or content construction module 412 illustrated in FIG. 4. Method 500 begins at operation 502.

At operation 502, the service provider server 102 may receive a request, by a playback device 106, to retrieve (and play) a content item. In certain embodiments, the request may be received through programming application 312 operating on the playback device 106. The request may be transmitted through a menu item available on a programming guide available on the playback device 106, such as via the playback module 360. In response to the request, the service provider server 102 may determine from which location the content item will be retrieved (e.g., a datastore of the service provider server or one of the cache servers).

At operation 504, the service provider server 102 may determine access rights associated with the playback device 106 and/or a user account associated with a user of the playback device 106. In certain embodiments, access may be limited or restricted based on the unique stored copy of recorded content item 122 on recording device 120. For example, if only a portion of the content item is recorded on recording device 120, then the access rights may dictate that the customer has access only to the recorded portion of the content item via playback device 106.

Further, the access rights may be based at least in part upon a wide variety of other factors, such as the preferences of a content provider from which service provider server 102 receives the content, the customer account settings, or preferences of the service provider associated with the service provider server 102. In certain embodiments, access rights associated with recorded content item 122 and/or a customer account may be identified and stored as part of the user data at one or more of the recording device 120, playback device 106, or service provider server 102. The access rights may also be retrieved and used by content construction module 412 when constructing the playback version of the recorded content item. A wide variety of restrictions and/or limitations may be utilized, as desired in various embodiments of the disclosure. For example, the determined access rights may indicate that playback device 106 is not permitted to access recorded content item 122 outside of a geographical subscription area (e.g., location data of the playback device might be included with the request for playback or at another point during the current session, such as log-in). As another example, the determined access rights may indicate that only a certain version of recorded content item 122 may be provided, such as a lower quality and/or lower resolution version of the recorded content item, a condensed and/or shortened version of the content item, and/or a preview of the content item. As yet another example, the determined access rights may specify that additional authentication credentials (e.g., a user name and a password, etc.) are required from playback device 106. As other examples, the determined access rights may specify that one or more advertisements and/or commercials will be added to the desired content and/or that the customer will be invited to pay for access to the desired content, for example, if the playback device is outside of the geographic subscription area (e.g., as an upgrade to a subscription plan, a one-time purchase, etc.).

At operation 506, the service provider server 102 may retrieve a recording identifier associated with recorded content item 122 on recording device 120. In some examples of the disclosure, the recording identifier may be retrieved from local storage, such as on user datastore 110, and in other embodiments it may be retrieved from the recording device 120. The recording identifier may define the specific recording of the content item made by the recording device 120, which may include time, duration, and/or identification parameters associated with the content item, etc. For example, a wide variety of suitable information associated with the recorded content item may be stored in the recording device 120, as desired in various embodiments, including but not limited to, an identifier of the recorded content item 122, and a recording time, a beginning time and an ending time associated with recorded content item 122.

At operation 508, the service provider server 102 may process the content item to generate a playback version of the recorded content item, which may be sent to the playback device 106 based at least in part on the recording identifier(s) and/or access information associated with one or more of the content item, playback device 106, or account of the requester. Examples of a transmission of the playback version to the playback device 106 may be discussed in further detail in reference to FIGS. 6-7, such as through various cache servers 112. In one example, recorded content item 122 may be retrieved from recording device 120. In another example, recording device 120 may automatically transmit the content item that is recorded on the recording device 120. In another embodiment, the customer may have the entire content item transmitted with access information, wherein playback device 106 limits playback of the content item based on the access rights, such as to just that of recorded content item 122.

At operation 510, the recorded content item 122 may be played by playback device 106. In some embodiments, if recording device 120 has recorded only a portion of the content item, then the access rights to the playback device 106 may be limited to the available portions of the content item on the recording device 120, as discuss above.

Figure 6:
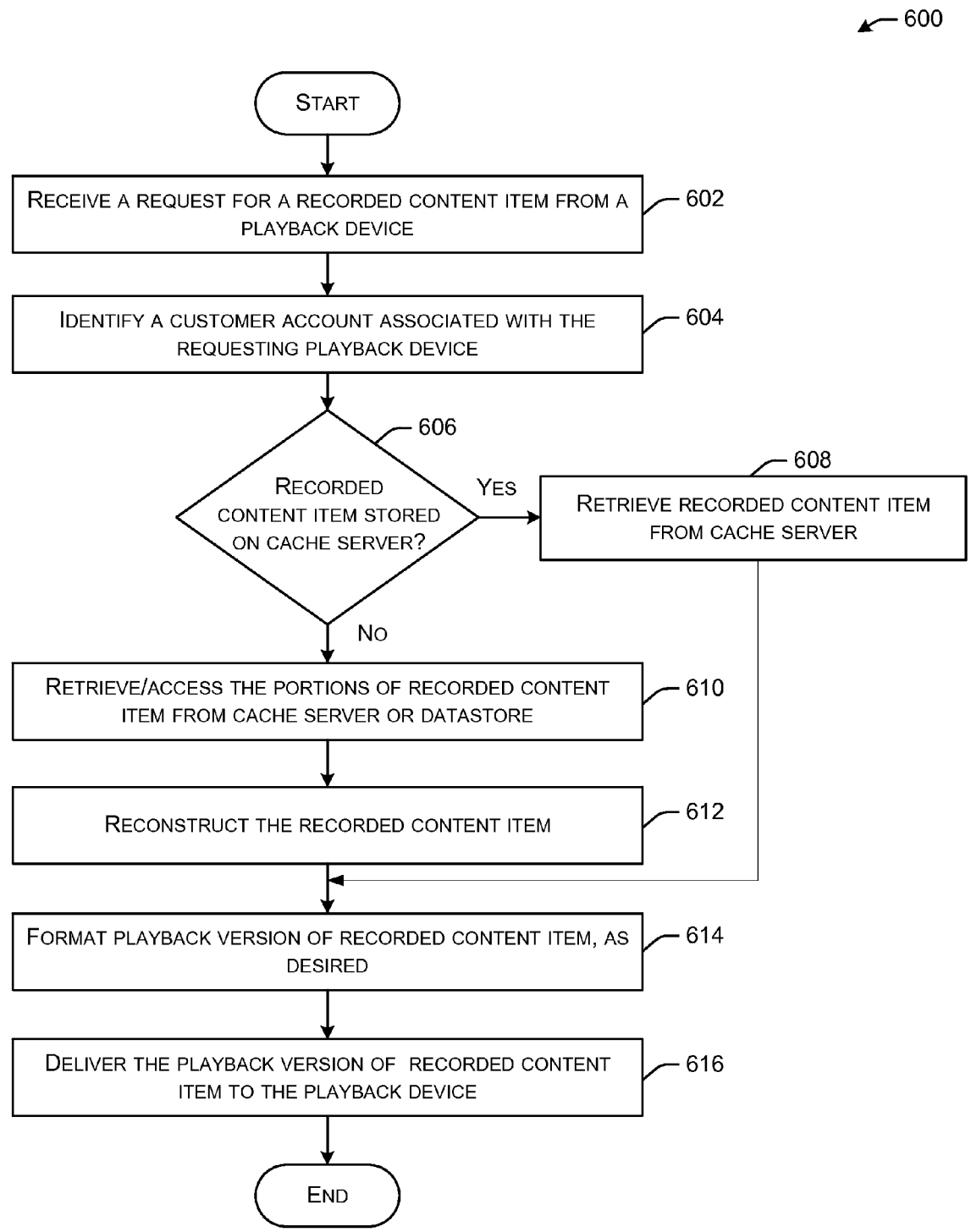
FIG. 6 is a flow diagram of an illustrative method 600 that may be performed by a service provider server 102 to facilitate the download or delivery of a recorded content item 122 to a playback device 106, according to at least one embodiment of the disclosure.

FIG. 6 is a flow diagram of an illustrative method 600 that may be performed by a service provider server 102 to facilitate the download or delivery of a recorded content item 122 to a playback device 106, according to at least one embodiment of the disclosure. The operations of method 600 may, for example, be performed by a suitable host module 410 and/or content construction module 412 associated with service provider server 102.

At operation 602, the service provider server 102 may receive a request for access to (e.g., playback of) a recorded content item 122. For example, a customer may utilize an interactive program guide to select recorded content item 122, and the request may be communicated to service provider server 102 by a playback device 106. As desired, a wide variety of different information may be included in a received request, such as an identifier of the recording device 120 associated with a customer, customer identification information, customer account information, identification information for the recorded content item 122, etc. In one embodiment, the service provider server 102 verifies that the customer's selected recorded content item 122 is available on the customer's recording device 120.

At operation 604, the service provider server 102 may identify a customer account associated with playback device 106 and/or the requesting customer using the playback device 106. In certain embodiments, a customer account (or other customer identifier) associated with playback device 106 may be identified. For example, a device identifier associated with playback device 106 may be utilized to access the user data, which may include customer account information, a listing of authorized customer devices, subscription information, access information, recording identifiers, etc.

At operation 606, a determination as to from where the recorded content item may be most efficiently delivered to the playback device is made. For example, it may be determined that a stored copy of the recorded content item is available at either service provider server 102 or on a cache server 112. Regarding the cache servers 112, the service provider server 102 may transmit a query to one or more cache servers 112 to determine if the recorded content item is available. If the recorded content item is available on a cache server 112, then the method 600 may be directed to operation 608. If the recorded content item is not available on a cache server 112, then the method may be directed to operation 610.

At operation 608, the service provider server 102 may retrieve a copy of recorded content item 122 from a cache server 112. For example, service provider server 102 may transmit a request to recording device 120 to transmit a copy of recorded content item 122 to the service provider server 102. Upon transmission, the method 600 may be directed to operation 614.

Beginning at operation 610, the steps recited may be performed by the service provider server 102 or the cache server 112, as may be desired for the most efficient processing and delivery of the playback version of the recorded content item. Accordingly, as described above, if the recorded content item is not available on a cache server 112, method 600 may be directed to operation 610. At operation 610, stored unique portions of the desired content item that are associated with recorded content item 122 may be accessed, for example, from the content datastore 114 associated with the service provider server or a suitable available cache server 112. The content items may be stored in transmission or clips that are limited in size or time. For example, the stored portions of the content item may be divided into one-minute intervals or a 3 GB interval, etc. If the content item is divided as described, the content item may be reconstructed at operation 612.

At operation 612, the recorded content item may be reconstructed based at least in part on recorded content item 122 recorded on recording device 120. Recorded content item 122 may be reconstructed at operation 612 by combining the retrieved portions of the content item and merging them with other retrieved portions of content items to create a unique portion of the content item, as may be desired in certain embodiments. In certain embodiments, a content construction module 412 may perform some or all of the operations of operation 612.

A wide variety of suitable methods and/or techniques may be utilized as desired to reconstruct the desired content item. For example, one or more markers included in the stored recorded content item 122 may be utilized to facilitate the insertion of the one or more unique portions, such as advertisements or special content. Once reconstructed, the recorded content item 122 may be downloaded or communicated to a playback device 106, for example in response to a customer requesting programming associated with the customer account.

At operation 614, in certain embodiments, the playback version of the recorded content item 122 may be formatted, encrypted, and/or otherwise processed (e.g., transcoded, segmented, fragmented, containerized, etc.) in order to provide protection and/or security for the recorded content item 122. In one example, the content item may be formatted into an MPEG-2 format so that it may be transmitted to legacy systems.

At operation 616, the playback version of the recorded content item may be delivered, for example, communicated, to the playback device 106. A broadband signal may be used and communicated over the network 108.

Figure 7:
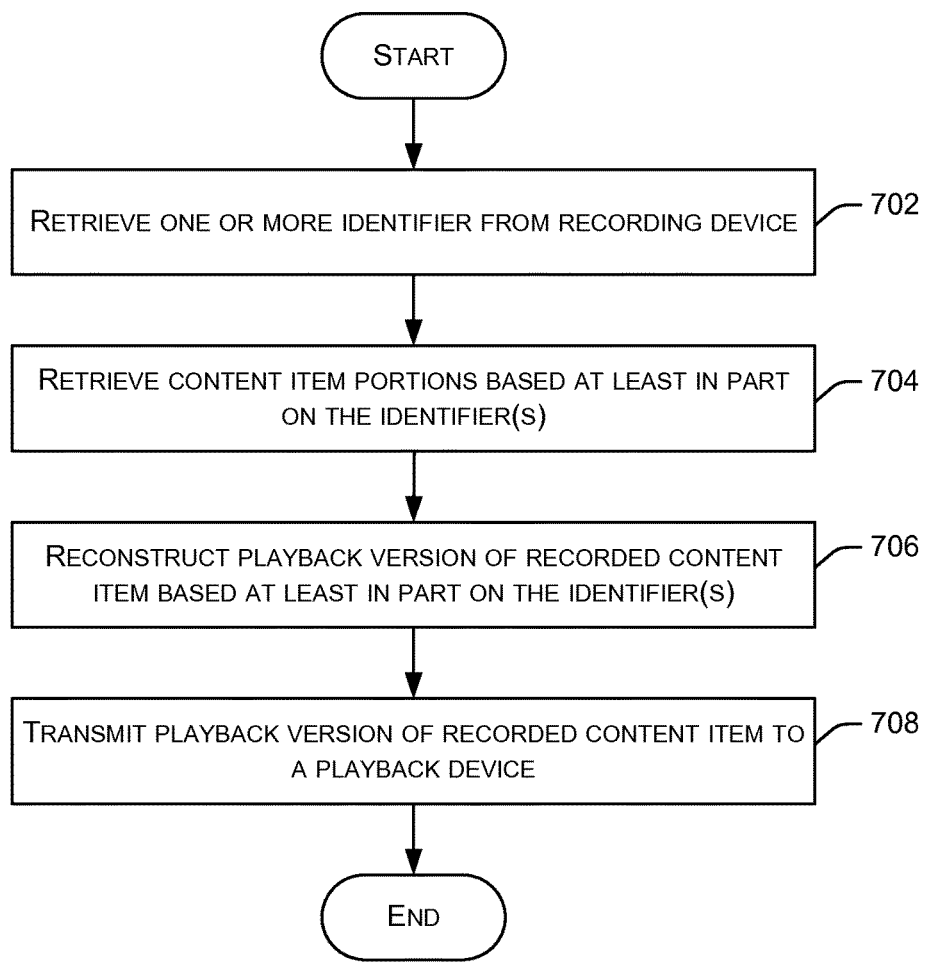
FIG. 7 is a flow chart of an illustrative method 700 for the reconstruction and transmission of a unique portion of content, according to at least one embodiment of the disclosure.

FIG. 7 is a flow chart of an illustrative method 700 for the reconstruction and transmission of a unique portion of content, according to at least one embodiment of the disclosure.

At operation 702, a recording identifier may be retrieved from recording device 120. In one example, the recording identifier may identify the recorded content item, a linear broadcast frequency, a start time for a recorded content item 122, and an end time. The recording identifier may also include a customer account associated with the unique portion of the content item that was recorded via the recording device 120. The recording identifier may also include a location or a subscription area for a customer associated with the recording device 120.

At operation 704, portions of the content item may be retrieved. In certain embodiments, portions of the content item may be stored in a plurality of cache servers 112. The service provider server 102 may retrieve the stored portions of the content items. For example, the portions of the content items may be retrieved from various cache servers 112 based at least in part on the recording identifier of the content item. Alternatively, the steps of operations 704-708 may be implemented by the cache server 112, eliminating the need to transmit the content item to the service provider server 102.

At operation 706, a playback version of a recorded content item, for example, the portion of the content item that was recorded, may be reconstructed based at least in part on the recording identifier. The playback version of a recorded content item 122 may be based on a time marker or other information in the recording identifier. The recording identifier may limit the access rights to the customer on playback device 106 based at least in part on the available recording on the recording device 120, for example, the start and stop times.

At operation 708, the playback version of recorded content item 122 may be transmitted to a playback device 106. The transmission may be facilitated through any broadband, Internet, or wireless signal.

The operations described and shown in method 700 of FIG. 7 may be carried out or performed in any suitable order as desired in various embodiments of the disclosure. Additionally, in certain embodiments, at least a portion of the operations may be carried out in parallel. Furthermore, in certain embodiments, less than or more than the operations described in FIG. 7 may be performed.

Figure 8:
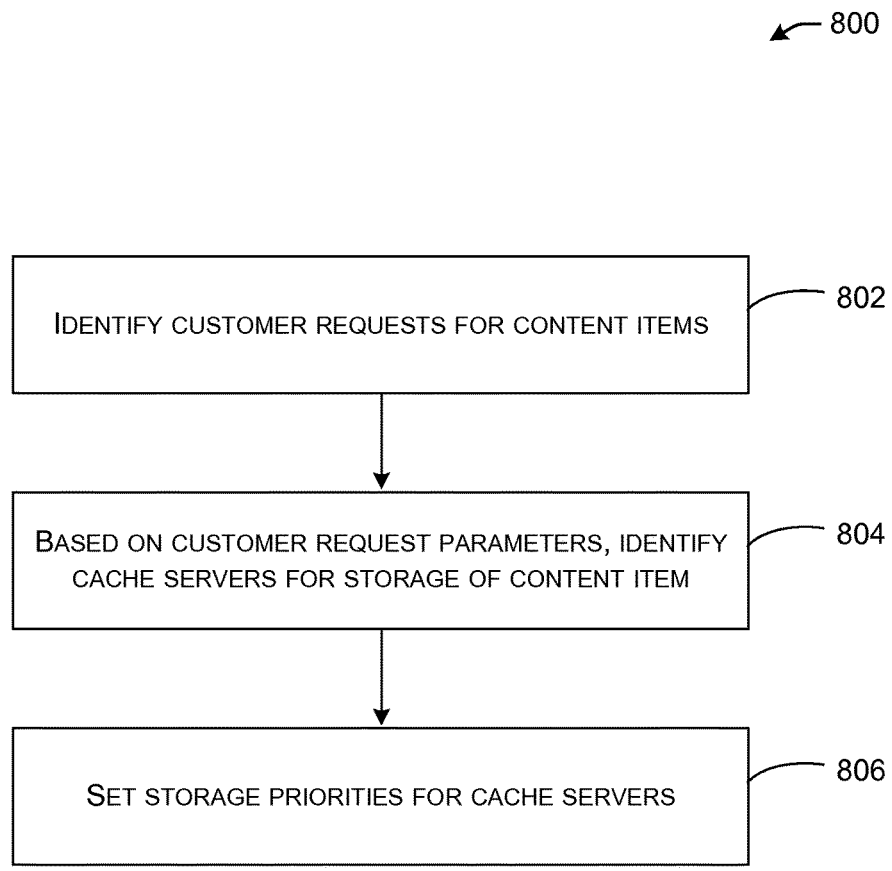
FIG. 8 is a flow diagram of an illustrative method 800 for placing content items in a cache server 112 according to at least one embodiment of the disclosure. For example, it may be desirable to identify certain content for storage on cache servers distributed throughout a geographic subscription area, also referred to as edge servers, to facilitate more efficient delivery of content items to users. The selection of what content to store on a cache server may be determined, at least in part, based on method 800.

FIG. 8 is a flow diagram of an illustrative method 800 for placing content items in a cache server 112 according to at least one embodiment of the disclosure. For example, it may be desirable to identify certain content for storage on cache servers distributed throughout a geographic subscription area, also referred to as edge servers, to facilitate more efficient delivery of content items to users. The selection of what content to store on a cache server may be determined, at least in part, based on method 800.

At operation 802, a plurality of customer requests for content items may be identified by service provider server 102. At operation 804, based at least in part on the customer requests, cache servers 112 may be identified for storage of a content item. The factors associated with such requests that may be considered may include day, time, frequency, and locality, etc. In certain embodiments, additional information associated with the content item may be considered, such as social media popularity, associated sales (e.g., box office, DVD, etc.), awards, etc.

At operation 806, priorities may be identified for storage and deletion of content items based at least in part on the identified customer requests. Various cache servers may delete the stored portions of the content items at different schedules based at least in part on the set of priorities. The priorities may indicate popularity, total number of requests, etc. Further, the content item requests may be predicted based on various factors and identifiers associated with them.

The operations described and shown in method 800 of FIG. 8 may be carried out or performed in any suitable order as desired in various embodiments of the disclosure. Additionally, in certain embodiments, at least a portion of the operations may be carried out in parallel. Furthermore, in certain embodiments, less than or more than the operations described in FIG. 8 may be performed.

Figure 9:
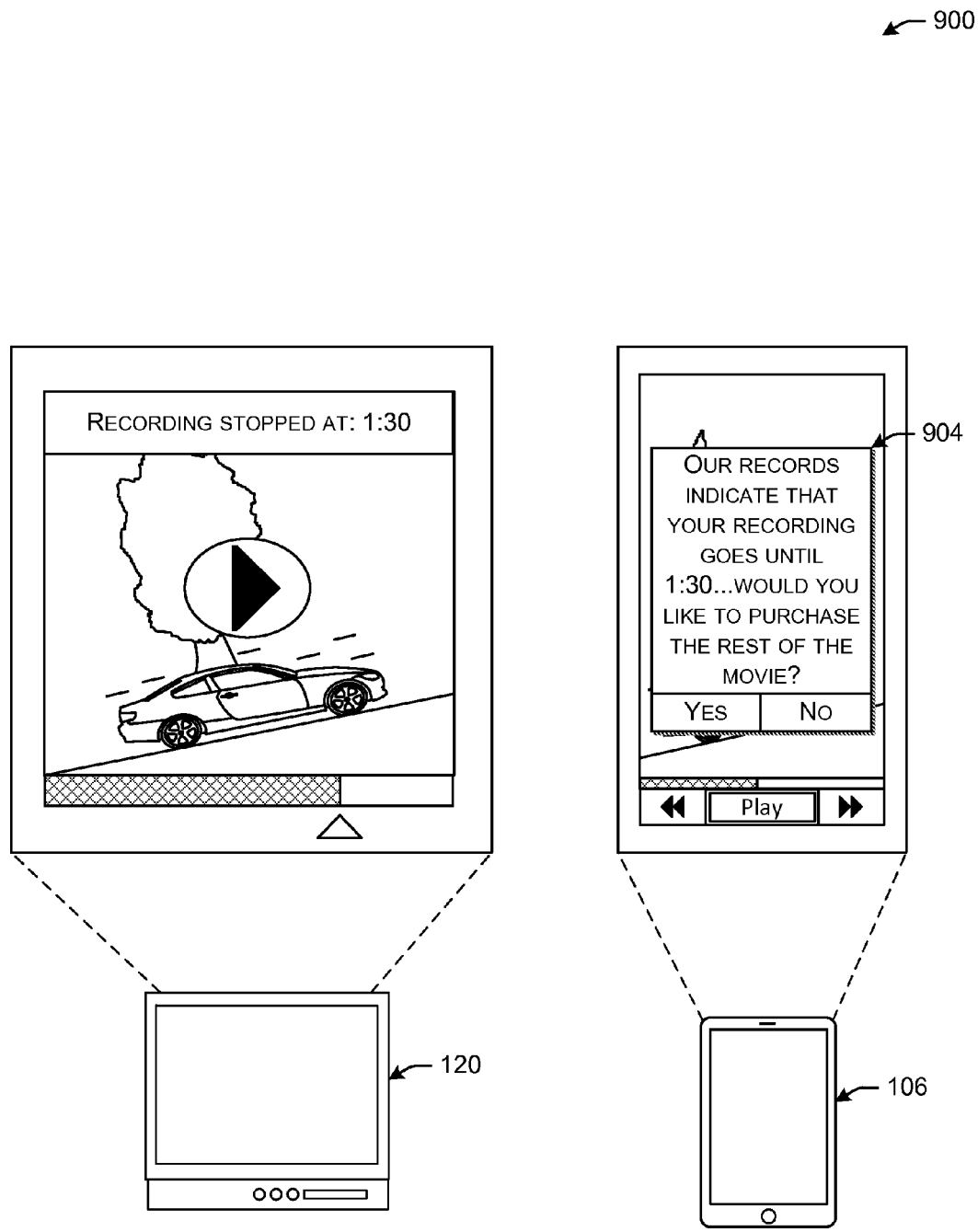
FIG. 9 is a diagram illustrating an example control of a content item on a recording device 120 and, according to at least one embodiment of the disclosure.

FIG. 9 is a diagram illustrating an example control of a content item on a recording device 120 and a playback device 106, according to at least one embodiment of the disclosure. For example, on a recording device 120, a unique recording of a content item may end at one hour and thirty minutes into the content item, while the content item lasts two hours. Accordingly, as only the recorded portion of the content item is available for playback on the playback device 106, the customer is unable to watch the final 30 minutes of the content item. However, according to at least one embodiment of the disclosure, the playback device 106, via the playback module 360, may present on the playback device 106 an option 904 to the user/customer to playback the remaining portion, for example, for a certain fee. The service provider server 102 may signal or otherwise communicate the offer or instruct the offer to be presented at the end of the playback period, operating alone or in conjunction with the playback module 360. If the user selects to purchase the remainder of the content item, the playback module 360 may communicate such information to the service provider server 102. The service provider server may then prepare and deliver the remainder of the content item to the playback device 106.

Various block and/or flow diagrams of systems, methods, apparatus, and/or computer program products according to example embodiments of the disclosure are described above. It will be understood that one or more blocks of the block diagrams and flow diagrams, and combinations of blocks in the block diagrams and flow diagrams, respectively, can be implemented by computer-executable program instructions. Likewise, some blocks of the block diagrams and flow diagrams may not necessarily need to be performed in the order presented, or may not necessarily need to be performed at all, according to some embodiments of the disclosure.

These computer-executable program instructions may be loaded onto a special purpose computer or other particular machine, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable memory that can direct a computer or other programmable data processing apparatus to function in a particular manner, such that the instructions stored in the computer-readable memory produce an article of manufacture including instruction means that implement one or more functions specified in the flow diagram block or blocks. As an example, embodiments of the disclosure may provide for a computer program product, comprising a computer-usable medium having a computer-readable program code or program instructions embodied therein, said computer-readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions and program instruction means for performing the specified functions. It will also be understood that each block of the block diagrams and flow diagrams, and combinations of blocks in the block diagrams and flow diagrams, can be implemented by special purpose, hardware-based computer systems that perform the specified functions, elements or steps, or combinations of special purpose hardware and computer instructions.

References are made to the schematic block diagram of systems, and methods and computer program products according to example embodiments of the disclosure. It will be understood that at least some of the blocks of the block diagrams, and combinations of blocks in the block diagrams, respectively, may be implemented at least partially by computer program instructions. These computer program instructions may be loaded onto a general purpose computer, special purpose computer, special purpose hardware-based computer, or other programmable data processing apparatus to produce a machine, such that the instructions which execute on the computer or other programmable data processing apparatus and create means for implementing the functionality of at least some of the blocks of the block diagrams, or combinations of the blocks in the block diagrams discussed.

These computer program instructions may also be stored in a computer readable memory that can direct a computer or other programmable data processing apparatus to function in a particular manner, such that the instructions stored in the computer-readable memory produce an article of manufacture including instruction means that implement the function specified in the block or blocks. The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the block or blocks.

One or more components of the systems and one or more elements of the methods described herein may be implemented through an application program running on an operating system of a computer. They also may be practiced with other computer system configurations, including handheld devices, multiprocessor systems, microprocessor based, or programmable consumer electronics, mini-computers, main computers, etc.

Application programs that are components of the systems and methods described herein may include routines, programs, components, data structures, etc. that implements certain abstract data types and perform certain tasks or actions. In a distributed computing environment, the application program (in whole or in part) may be located in local memory, or in other storage. In addition, or in the alternative, the application program (in whole or in part) may be located in remote memory or in storage to allow for circumstances where tasks are performed by remote processing devices through a communication network.

Many modifications and other embodiments of the disclosure set forth herein will be apparent having the benefit of the teachings presented in the foregoing descriptions and the associated drawings. Therefore, it is to be understood that the disclosure is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A method of displaying recorded content to a user, comprising:
receiving, from a playback device and by a service provider system comprising at least one processor, a request to retrieve a recorded content item, wherein the recorded content item is recorded on a recording device;
identifying, by the service provider system, based at least in part upon the received request, at least a portion of the recorded content item as a unique recording specific to the recording device, the portion corresponding to a first program portion associated with the recorded content item and a second program portion associated with the recorded content item, wherein the first program portion and the second program portion are non-contiguous portions of the recorded content item;
retrieving, from the recording device, one or more identifiers that are indicative of the recorded content item; and
facilitating, by the service provider system and based at least in part on the one or more identifiers, access of the unique recording to the playback device, the facilitating comprising:
concatenating the first program portion and the second program portion, and
transmitting the concatenated first program portion and second program portion to the playback device.

2. The method of claim 1, wherein facilitating access of the unique recording to the playback device further comprises identifying one or more cache servers that store the first program portion or the second program portion.

3. The method of claim 2, wherein identifying one or more cache servers further comprises identifying at least one cache server having the first program portion or the second program portion based at least in part on a priority associated with the at least one cache server.

4. The method of claim 2, wherein facilitating access to the playback device of the unique recording further comprises retrieving the first program portion or the second program portion from the identified one or more cache servers.

5. The method of claim 1, wherein facilitating access of the unique recording to the playback device further comprises retrieving the first program portion or the second program portion from the recording device.

6. The method of claim 1, further comprising storing a plurality of portions of the recorded content item by one or more storages associated with the service provider system, wherein the plurality of portions comprises the first program portion and the second program portion.

7. The method of claim 1, wherein the playback device comprises a cable set-top box.

8. A service provider system, comprising:
one or more communications interfaces configured to receive, from a playback device, a request to retrieve a recorded content item on a recording device; and
one or more processors configured to:
identify, based at least in part upon the received request, at least a portion of the recorded content item as a unique recording specific to the recording device, the portion corresponding to a first program portion associated with the recorded content item and a second program portion associated with the recorded content item, wherein the first program portion and the second program portion are non-contiguous portions of the recorded content item;
retrieve, from the recording device, one or more identifiers that are indicative of the recorded content item; and
facilitate, based at least in part on the one or more identifiers, access of the unique recording to the playback device by:
concatenation of the first program portion and the second program portion, and
transmission of the concatenated first program portion and second program portion to the playback device.

9. The system of claim 8, wherein the one or more processors is further configured to configure access rights to the unique recording on the playback device based at least in part on the one or more identifiers that are indicative of the recorded content item.

10. The system of claim 8, wherein the one or more processors is further configured to facilitate, based at least in part on the one or more identifiers, access of the unique recording to the playback device by formatting the concatenated first program portion and second program portion based at least in part on the playback device.

11. The system of claim 8, wherein the one or more processors is further configured to facilitate, based at least in part on the one or more identifiers, access of the unique recording to the playback device by retrieval of the first program portion or the second program portion from one or more cache servers.

12. The system of claim 11, wherein the first program portion or the second program portion is stored on the one or more cache servers based at least in part on a predetermined priority.

13. The system of claim 8, wherein the playback device comprises one of: (i) a cable set-top box, (ii) a tablet computer, (iii) a smartphone, (iv) a gaming console, (v) a laptop computer, or (vi) a desktop computer.

14. A method comprising:
receiving, by a service provider system having one or more processors, one or more identifiers that are indicative of a recorded content item specific to a recording device associated with a user account, wherein the recorded content item comprises a first program portion and a second program portion, wherein the first program portion and the second program portion are non-contiguous portions, and wherein the one or more identifiers indicate at least an initial time and a final time associated with the recorded content item; and
facilitating, by the service provider system and based at least in part on the one or more identifiers, access of a unique recording to a playback device, the facilitating comprising:
concatenating the first program portion and the second program portion, and
transmitting the concatenated first program portion and second program portion to the playback device.

15. The method of claim 14, wherein facilitating access of the unique recording to the playback device further comprises identifying a cache location associated with the recorded content item based at least in part on a location of the playback device.

16. The method of claim 14, wherein concatenating the first program portion and the second program portion is based at least in part on the initial time and the final time.

17. The method of claim 14, wherein facilitating access of the unique recording to the playback device, further comprises:

encrypting the concatenated first program portion and second program portion in a manner specific to the playback device associated with the user account; and transmitting the encrypted concatenated first program portion and second program portion to the playback device.

18. The method of claim 14, further comprising:

receiving, by the service provider system, a request for the recorded content item.

19. The method of claim 14, further comprising:

storing the first program portion or the second program portion for a predetermined period of time based at least in part on the one or more identifiers.

* * * * *